United States Patent [19]

Horne

[11] 4,230,049
[45] Oct. 28, 1980

[54] COMPOSITE STRUCTURAL SYSTEM AND METHOD AND APPLICATIONS TO PALLETS AND PLATFORMS

[75] Inventor: Fred H. Horne, Rye, N.H.

[73] Assignee: Ellis Paperboard Products, Inc., Portland, Me.

[21] Appl. No.: 11,229

[22] Filed: Feb. 12, 1979

[51] Int. Cl.³ .............. B65D 19/32; B65D 19/34; B32B 23/08; B05D 7/00
[52] U.S. Cl. .............. 108/51.1; 52/309.15; 52/807; 108/51.3; 108/57.1; 108/901; 156/305; 229/28 R; 229/42; 427/391; 427/411; 428/514; 428/530; 428/537
[58] Field of Search ............ 108/51.1, 51.3, 53.1, 108/53.3, 55.1, 56.1, 57.1, 901, 902; 229/42, 28 R; 217/22, 18; 206/386, 596, 599, 600; 156/305; 427/411, 386, 391; 428/116, 537, 530, 514; 52/309.1, 309.15, 806, 807

[56] References Cited

U.S. PATENT DOCUMENTS

| | | | |
|---|---|---|---|
| 1,370,666 | 3/1921 | Novotny | 427/411 X |
| 2,468,086 | 4/1949 | Latham et al. | 427/324 X |
| 2,837,779 | 6/1958 | Jacobs | 428/116 X |
| 2,908,464 | 10/1959 | Trandt et al. | 108/51.3 |
| 2,996,276 | 8/1961 | Sorensen et al. | 108/51.3 |
| 3,131,656 | 5/1964 | Houle | 108/51.3 |
| 3,248,275 | 4/1966 | Lincoln | 428/426 X |
| 3,494,826 | 2/1970 | Scheiber | 427/391 X |
| 3,574,103 | 4/1971 | Latkin | 428/116 X |
| 3,680,494 | 8/1972 | Giasi | 108/56.1 X |
| 3,752,089 | 8/1973 | Bartels | 108/51.3 X |

FOREIGN PATENT DOCUMENTS

| | | | |
|---|---|---|---|
| 1234672 | 2/1967 | Fed. Rep. of Germany | 427/411 |
| 1082936 | 1/1955 | France | 428/116 |
| 1144715 | 3/1969 | United Kingdom | 108/51.3 |

*Primary Examiner*—William E. Lyddane
*Attorney, Agent, or Firm*—Daniel H. Kane, Jr.

[57] ABSTRACT

A new and improved structural system comprising an interpenetrating plastic and substrate network material composite including two phases, a first phase comprising a substrate of intersecting partitions of paper material or other fibrous or absorbent material defining a cellular lattice, and a second phase comprising a polymerized plastic material penetrating and intimately contacting the structure of the paper or other fibrous or absorbent material filling the voids and interstices between the fibers of the paper material and hardened to a desired condition of rigidity. The cellular lattice of composite material is coated with at least one coating of plastic material adherent to and chemically binding with the hardened composite surface and with sufficient agglomerating or aggregative characteristics to form plastic weldments or fillets at the intersections of the substrate partitions. The structural system is applied in pallets, platforms, and other load bearing applications, as well as partitions, separators, and insulation applications.

34 Claims, 29 Drawing Figures

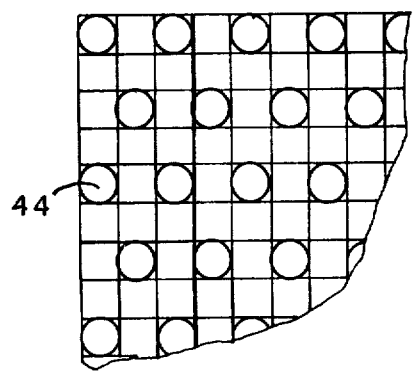
FIG IA
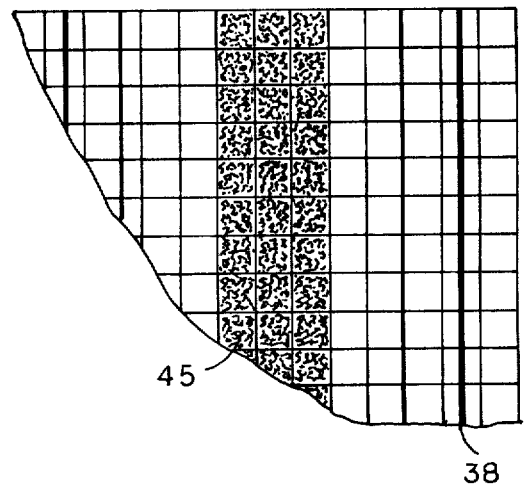
FIG IB
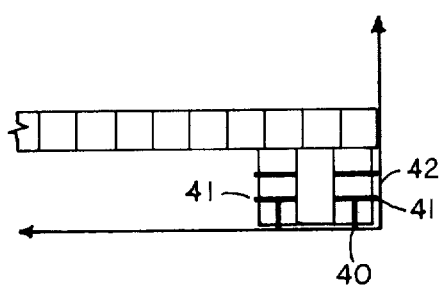
FIG 2A
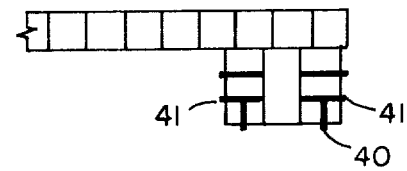
FIG 2B
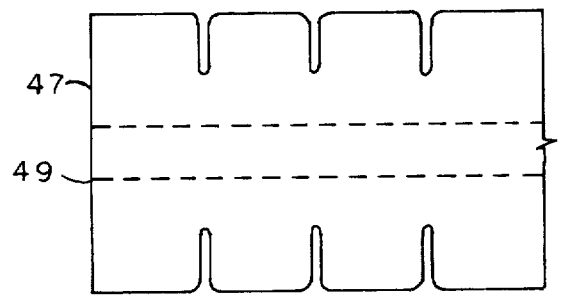
FIG 2C
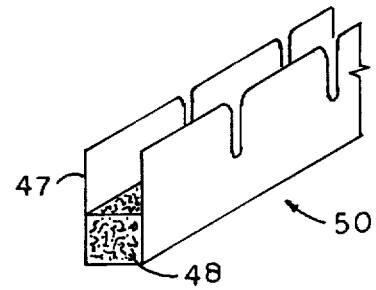
FIG 2D

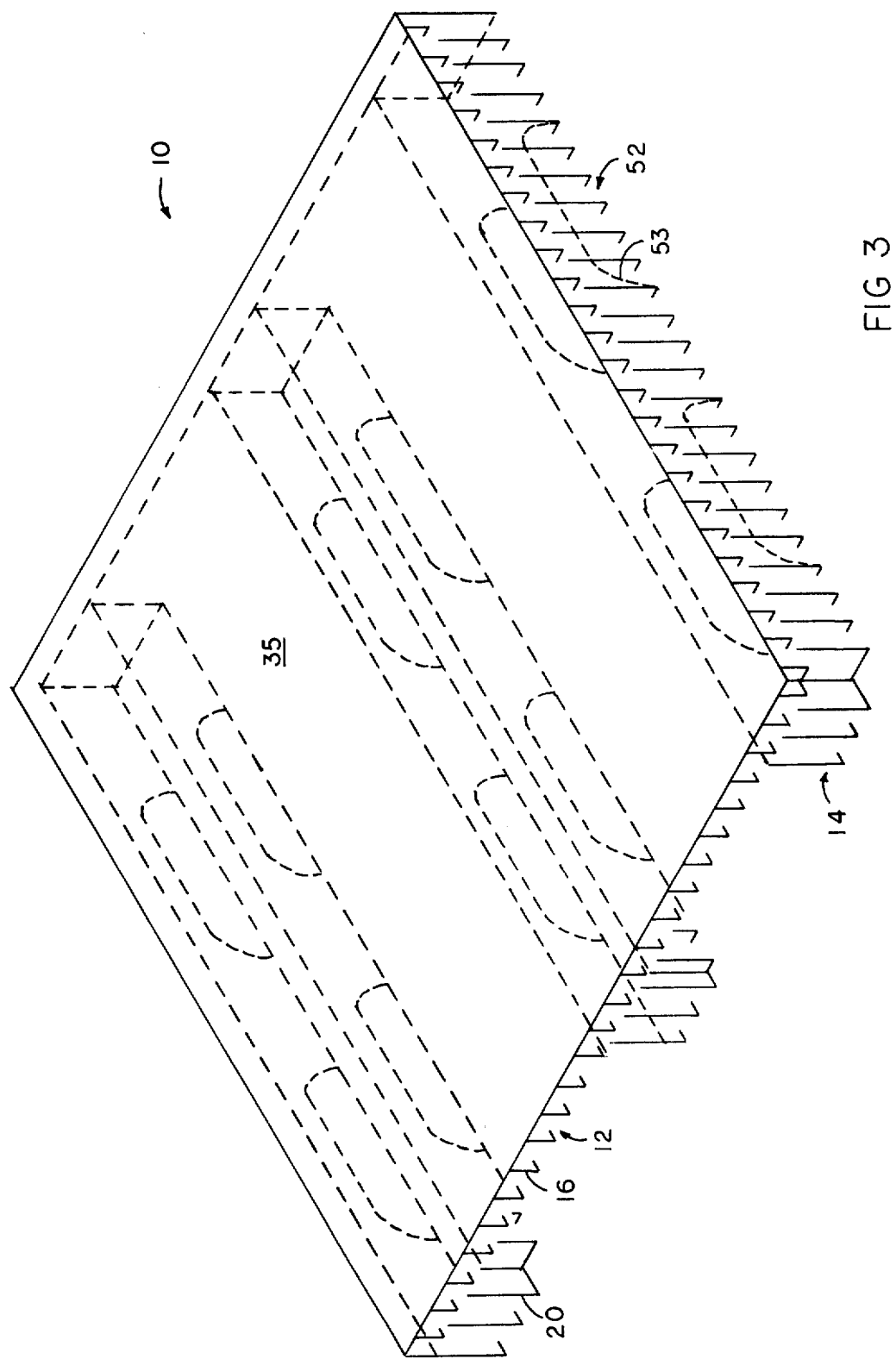

COMPOSITE STRUCTURAL SYSTEM AND METHOD AND APPLICATIONS TO PALLETS AND PLATFORMS

FIELD OF INVENTION

This invention relates to a new and improved design and composition for cellular lattice structural systems; the methods for making same from composite materials; and applications of the system and method for pallets and industrial platforms both stationary and portable and for other structural and load bearing applications including but not limited to building materials and other ancillary equipment.

BACKGROUND OF THE INVENTION

A pallet is a horizontal portable platform device used as a base for assembling, storage, handling and transporting in a unit load. Pallet structures must be made of hard durable materials constructed to bear high compressive loads over long periods of time, repeated rough usage and high intensity impacts during handling. As a result, wooden pallets for heavy load requirements may weigh as much as 60 to 90 pounds dry and up to 120 pounds wet for 42×48 oak pallets. Wooden pallets also suffer disadvantages in that nails work loose, the pallet skews, unbalancing loads, sometimes digging into boxes on the side of the tilt. Or, decking surface members may break, digging and gouging a load material. More recently developed plastic pallets manufactured by conventional molding techniques, such as compression molding, injection molding and vacuum molding afford the strength at somewhat reduced weights but only at greatly increased cost. Similarly, materials such as fiberglass and honeycomb which have also been applied in pallet structures are expensive in material and labor, disproportionately increasing the pallet cost. Conventional paperboard and corrugated board pallets of the disposable type are limited in the compressive strength limits of the paper material that is used, however it is structured.

Another disadvantage of lumber and wood pallets and pallets of wood and paper products is that such materials are hygroscopic, susceptible to changes in moisture content with changes in ambient humidity and wetness. The intrinsic strength of such wood and paper products materials varies with degree of moisture content.

Similarly wood and paper products for use in pallets are normally susceptible to attack and rot by bacteria, fungi, nematodes, etc. In addition, they provide environments which may harbor and support viruses and other human pathogens and pyrogens. It is difficult if not impossible to sterilize, steam clean, or otherwise decontaminate pallets made of such materials for reuse in handling food for human consumption.

It is therefore an object of the present invention to provide a new and improved lightweight, low-cost material structural system and method of constructing same which affords the desired characteristics of toughness, rigidity, hardness, high impact, high compressive strength, and durability in rough handling suitable for use in pallets, industrial platforms and in many other load bearing applications such as building materials in floors, walls, ceilings, etc.

Another object of the invention is to provide a structural system which can be formed from commonly available low-cost paper, paperboard, or other fibrous material and plastic materials combined in interpenetrating network composites to give the desired impact and compressive strength characteristics.

A further object of the invention is to provide new cellular lattice arrangements for structural systems using conventionally available separators for packaging partitions, and separators for packaging elements of the type produced by the paper box manufacturing industry and to new methods and weldments for such partition intersections to rigidify and strengthen partition lattices.

It is also the purpose of this invention to provide structural systems and methods for pallets and other load bearing applications of new material composites impervious to moisture and wetness and with intrinsic strength independent of ambient humidity and wetness. Similarly, such composite materials and structural systems in contemplation of the present invention will be resistant to attack or rot from microorganisms and be non-porous to prevent harboring pathogens, pyrogens, etc.

SUMMARY OF THE INVENTION

In order to accomplish these results, the present invention contemplates providing a new and improved structural system comprising an interpenetrating plastic and substrate network material composite including two phases, a first phase comprising a substrate of intersecting partitions of paper material or other fibrous or absorbent material defining a cellular lattice, and a second phase comprising a polymerized plastic material penetrating and intimately contacting the structure of the paper or other fibrous or absorbent material filling the voids and interstices between the fibers of the paper material and hardened to a desired condition of rigidity. According to the invention the resulting cellular lattice of composite material is coated with at least one coating of plastic material adherent to and chemically binding with the hardened composite surface and with sufficient agglomerating or aggregative characteristics to form plastic weldments or fillets at the intersections of the substrate partitions. The plastic weld joints at the acute or obtuse angular intersections of the partition elements afford added rigidity and strength to the cellular lattice.

The invention also contemplates the method of forming such a structural system by assembling a plurality of paper material partitions into a cellular lattice structure; saturating the lattice structure paper material with a liquid saturating solute system containing polymerizable plastic material sufficiently liquified to saturate and be absorbed by the paper material, filling the voids and interstices of the fibrous structure of the paper material, driving out the air and gases; polymerizing and casting said plastic materials from the solute system to form a relatively tough and rigid composite material lattice cellular structure; and coating composite material lattice structure with at least one coating of a plastic material adherent to and bonding with the composite surface and forming agglomerative weld joints or fillets at the intersections of the substrate partitions further rigidifying and strengthening the cellular lattice structure.

A feature of the invention is that the resulting plastic and paper composite affords the advantages of high compressive strength fiber filled polymers. In this case the paper material substrate forms a continuous phase fibrous filler, with a polymer phase interspersed throughout and bonded to the paper mat and with a resilient surface skin rich in the polymer material. In addition to good adhesion and cohesion between the phases, the composite is characterized by chemical bonding and linking between the polymer material and the cellulose of the substrate. The material contemplated by the invention for fabricating the cellular lattice structure therefore yields increased stiffness, strength, dimensional stability and toughness characteristic of polymer/filler interpenetrating skeletal network composites. Other advantageous characteristics of the composite include imperviousness to moisture and microorganisms.

Another feature of the invention is that a variety and multiplicity of starting polymers and plastics can be prepared and liquified in a solute system for polymerization and casting in accordance with the invention. An advantage of this feature is that the structural characteristics of the final cast polymerized composite can be varied and determined according to the characteristics of the starting material and the characteristics to which they give rise in co-polymerization, cross-linking, and phase adhesion. For example, in one embodiment the invention contemplates starting with a variety of polyblends, including a major portion of a rigid phase such as polystyrene and styrene synthetic resins and a lesser portion of a rubbery phase such as polybutadiene and butyl resins. Such polyblends characteristically yield tough, rigid, hard, high impact, high compressive strength heterogenous unoriented polymers suitable for intimate composite bonding with the fibrous network paper "filler."

Starting polymers and polymer blends may include rigid plastics such as polystyrene and styrene blends, high density polyethylene and ethylene co-polymers, polycarbonates, PVC and PVC polyblends; high polarity polymers such as polyacrylonitrile, polypropylene, poly vinyl acetate, polyester resins, cellulosic polymers and nylons; highly cross linked plastics such as phenol formaldehyde resins and epoxy resins; long chain polymers such as methacrylate polymers; polymer polyblends including rubbery phases such as ABS rubber, and butyl rubbers generally; acetal resins such as Delrins; ring forming polymers; and blends of a multiplicity of the foregoing calculated to give the desired properties to the structural system.

In general, a blend of starting polymeric monomer and other plastic materials is liquified in a solvent system. The single polymer or polymer blend is selected so that the composite resulting from saturation, impregnation and the resultant polymerization in the fibrous network of the paper, yields tensile strengths of 150 to 400 psig and typically 200 psig contrasted with the tensile strength of the original paperboard partition substrate of only 10-25 psig. (Psig or psi gauge—takes into account 14.7 psi atmospheric pressure; i.e., the psi at sea level.) The polymeric materials combine in a variety of ways including co-polymerization, terpolymerization, graft and block polymerization, building up the structural properties of the composite. A thorough discussion of the use of polyblends in achieving desired structural characteristics, and presentation of the fully developed state of the art in plastic and polymer structural design and engineering characteristics is found in Lawrence E. Nielsen, *Mechanical Properties of Polymers and Composites*, Volumes I and II, Marcel Dekker, Inc., Publisher, New York, 1974, particularly Volume 1, Pages 216 and 217, and the references cited for particular polyblends.

In a preferred embodiment of the structural system and method, polymer cross-linking by thermosetting or any other means is effected, building up a durable, hard, strong and high impact composite through extensive "cis" and "trans" polymer bonding. However, it is also possible to achieve the desired structural characteristics of rigid strength through other molecular characteristics besides cross-linked polymers. For example, linear polymers may produce the desired characteristics through high polarity between adjacent strands, high molecular weight, high crystallinity, polymer chain topology and any other means of strong matricizing, etc. All these characteristics are assessed at length and polymers achieving specific characteristics are referenced in the Nielson work on *Mechanical Properties of Polymers and Composites* cited above. In general, the present invention contemplates starting with polyfunctional monomers and polymer fragments to produce a complex composite. Such polyfunctional starting elements normally lead to cross-linking in the polymerized plastic yield but can also lead to ring forming linear polymers having the desired structural characteristics because of high molecular weight, high polarity, etc. and generally good adhesion between the phases of the polyblend and cellulosic paper phase. Extensive examples of polyfunctional monomer ring-forming polymerizations are described and referenced in Cotter and Matzner, *Ring-Forming Polymerizations*, Organic Chemistry Series, Volume 13-A, Academic Press, Publisher, New York, 1969.

Thus, the present invention typically contemplates starting with a blend of polyfunctional monomer and polymer fragments sufficiently liquified to penetrate and impregnate a fibrous material such as paper and the like. This is accomplished by incorporating the starting plastic materials in a solute system appropriate to the plastic materials, that is, including a good solvent or solvents for each constituent. A good solvent will permit closest approach to continuous phase casting of the plastic constituent to which it is adapted. A poor solvent for a particular plastic constituent will result in greater or lesser amounts of dispersed phase casting of the particular constituent in the paper substrate network. A variety of solvents or solute carriers may be used including, for example, ethyl acetate, toluene, carbon tetrachloride, methyl ethyl ketone, methyl butyl ketone, benzene, and other well-known organic solvents. The solute carriers selected for the solute system are, of course, those appropriate to the starting plastic material or materials and preferably a good solvent or solvents are utilized. According to the invention, the starting plastics are incorporated into a solute system so that the plastic polymer fragments and monomers are sufficiently "liquified" and/or gelled so that they can fully migrate throughout the voids and interstices of the fibers of the substrate material, such as paper. In addition to the possibilities of a multiplicity of starting solids or plastics and a multiplicity of solvents or solute carriers, a variety of stabilizers, hardeners, initiators and terminators may also be used to control subsequent polymerization as is well known in the art, controlling initiation, propagation, and termination of the subsequent polymerization reactions.

In the preferred embodiment of the invention, the solute system selected from a multiplicity of starting plastics and solvents comprises a solvolysis system from which polymerization of the constituents takes place in the saturated material substrate such as paper in situ by "flashing" off the solvent system vapors. A solvolysis reaction is a reaction involving substances in solution, in which the solvent reacts with the dissolved substance (solute) to form a new substance. Intermediate compounds are usually formed in this process. While in the solvent or liquid state, the monomer and polymer fragments migrate throughout the fibrous substrate and tend to equalize in distribution. As solvent vapors are removed during air flashing or curing, "cis" and "trans" bonding and linking takes place in situ, with migration and adjustment of the constituents as required until the polymerization proceeds to the solid state. As the reaction proceeds to completion, air pressure, gravity forces, absorptive forces, ionic forces, and polymer bonding displacement forces combine to drive the air and solvent system generated vapors and gases from the interstices and voids of the paper fibrous network, nearly completely filling out the substrate, with good adhesion between the phases and actual chemical bonding between the polymer or polyblend and the cellulose, hemicellulose and proteinaceous binding constituents of the paper. While initial solidification takes place in a matter of minutes, final hardening takes place over a period of several weeks with air curing. The period of curing will be accelerated by slightly elevated temperatures (e.g., 85°-100° F.) but not higher, to avoid super gasification which would release bubbles bound in the structure of the coating, weakening it.

In situ polymerization refers to the preferred method of bonding and cross-linking by migration of constituents under influence of natural forces of internal cohesion. Any other accepted method or means may also be used such as application of heat, pressure, gasification or any other internal or external drive means to effect polymerization and accelerate, propagate, and terminate polymerization. Thus, the preferred method of polymerization in situ might be characterized as polymerization in ambience without external drive or very little external drive, e.g., slightly elevated temperatures, etc. while other methods of polymerization might also be used, characterized by external drive or imposed gradient of heat, pressure, etc.

Turning to the paper material substrate, this substrate is comprised in the preferred form of intersecting paperboard partition elements of the type long manufactured by the paper and box industry. Such partition elements are variously referred to in the trade as partition sections, dividers and separators, and the resulting assemblage of intersecting elements, sections, dividers or separators are known as partitions, egg crates, crates, cells, etc. In addition to paperboard, other materials such as wood, kraft paper, etc. may be used. These interlocking or intersecting partitions of elongated elements with slots at regular intervals combine to form a lattice of four sided parallelogram cells. According to the invention, the substrate is made of paper material such as paperboard, cardboard, corrugated board, boxboard, chipboard, bogus paper, kraft paper and generally any sheet material of a cellulosic or other nature either fibrous or non fibrous as long as it is absorbent, including wood, pressed wood, fiberboard and plastic elements of a structural form. As used herein and in the following claims the phrases "paper-like material" or "absorbent paper-like material" are intended to include the foregoing sheet materials. A feature and advantage of the invention is that the cellulosic, hemicellulosic and proteinaceous constituents of the paper material in some cases chemically bind or bond and cross-link with the saturating polymer or polyblend to form a composite of great strength per unit weight.

It is apparent that the molding or casting method of the present invention eliminates the conventional mold by use of a substrate for shaping which in the process itself becomes incorporated into the cast product as a continuous phase in a composite structure. The method of the present invention might be characterized as an in situ casting upon or throughout a fibrous, absorbent or penetrable substrate or network, or saturation casting throughout a substrate from a solute system, solute carrier or solvent system which involves a dissolved or liquified polymer/plastic blend in solvents for casting from a solvolysis system as described above. The paper material substrate comprises an internal mold, or more accurately, a "ubiquitous" mold or network mold for shaping or determining the shape of the composite as finally cast, polymerized, solidified, etc. It is a form of polymerization casting, so to speak, by providing a substrate to support in situ polymerization according to the shape of the substrate which, in addition, may enter into the polymerization of the cast saturant by chemical bonding. In this respect, the invention affords a new method of shaping and casting polymerizable materials.

After transforming the cellular lattice of the original paper material partition substrate into a plastic and paper network interpenetrating composite of greatly increased strength, further steps are contemplated by the invention. In accordance with these additional procedures, the lattice composite is coated or laminated with at least one additional coating of plastic material adherent to and chemically binding with the composite surface and with sufficient agglomerative or aggregative characteristics to form agglomerative plastic welds at the angular intersections of the lattice cells where the original paper partition substrate elements intersect. Thus, the invention contemplates formation of plastic weldments, thickened weld joint or fillets where cell walls meet, in order to further strengthen the lattice structure. Additional coatings may also be provided to thicken once again and build up the welds for heavy duty, heavy load usage. Thus, the original saturating solvolysis system also forms a base coat or layer for receiving additional layers or laminates which cross-link with the base and subsequent layers with interpolymerization between the laminates. Each added coating is a similar polymer solvolysis system which softens by solvent action the previous layer, the interface becomes gelled, and migration and interspersing of chemical components occurs for an in situ polymerization laminate bond. Thus, the laminate layers are chemically bonded one to another by in situ polymerization.

Certain characteristics may be imparted to the substrate paper material, saturating polymer or polyblend material and coating plastic materials in order to effect the methods of the invention. Thus, in a preferred approach, where the paper substrate bears on acidic or cationic nature, as may be the case with kraft type papers, the saturating solute system selected from a multiplicity of polyfunctional monomer and polymer constituents and a multiplicity of solute carriers is adjusted by additives to have a slightly anionic or basis character so that it will be more forcefully absorbed by the paper material and will be dispersive within the fibrous network of the paper rather than agglomerative. On the other hand, the initial coating material which is a similar plastic solute and solvolysis system, otherwise prepared in a manner similar to the saturating solute system, is adjusted to be neutral so that internal cohesive agglomerative or aggregating forces can be expressed particularly at the points where walls of cells meet and intersect, selectively building up thickened plastic weldments, fillets or gussets at these intersections which rigidify and structurally prepare the lattice for bearing stresses and loads.

In accordance with another aspect of the invention, a plurality of subsequent coatings may be applied, in each case calculated to adhere and cross-link to the previous surface and further build up the strength of the lattice walls, and particularly, the strength of the lattice intersections. The coatings may each be of a neutral character, but in one form, may be of alternately opposite character; i.e., anionic/cationic/anionic, etc. to increase adhesion and cross-linking between the layers. The initial paper network plastic interpenetrating composite thus becomes a component layer in a strongly adhering laminate of layers. While the initial saturation forms the interpenetrating composite, subsequent coatings are calculated to laminate upon the composite lattice structure rather than penetrate. Cross-linking characterizes the bonding between chemical or polymer laminate layers and this interpolymerization of the component layers produces a chemically bonded laminate as well as physically bonded. In other words, the composite base and laminate layers form a monolithic structure.

In forming pallets in accordance with the invention, the new and improved lightweight, low-cost, high strength cellular lattice of composite material is used as the core material for the deck and legs of the pallet structure of the type with a flat deck for supporting a load and legs spacing the deck from the ground to permit entry of fork lift tines for lifting the pallet and supporting the load. The legs and deck may be held together and bonded by the subsequent coatings or laminates with in situ polymerization across joints as previously described. The cell walls of the lattice are oriented perpendicular to the ground, that is they are oriented in the direction of bearing of the supported load, and the upper deck surface is covered with a flat sheet paper and plastic material composite including two phases as heretofore described with reference to the paper and plastic composite partition elements. At least one additional plastic coating is applied, adherent to the composite surface, with agglomerative characteristics forming continuous weldment or plastic weld fillets along the lines of contact of the deck sheet and lattice cell walls at the upper surface of the core where the sheet and lattice wall intersect. Preferably, the decking to lattice fillets or weldments are formed to be a greater thickness than either the deck or partition elements.

A variety of pallet structures, forms, and configurations may be formed incorporating the structural system of the present invention. For example, pallets of different sizes, or with different cell sizes in the lattice structure in order to vary the density of material and bearing strength have been fabricated. Both two-way and four-way pallets may be made with runner legs or pedestal legs. Reversible pallets with decks on the top and bottom and legs or pedestals sandwiched in between may be made. Prior to coating or at intermediate coatings, reinforcing partition elements of wood or other structural material may be inserted in the legs from below cut to extend a fraction of an inch below the bottom of the lattice to provide floor skids. Similarly, such wood or other structural material element can be inserted prior to coating into the inner walls of the legs, projecting slightly beyond the leg walls to provide fork lift tine guards. Other features and advantages of such structural floor skids and tine guards inserted into the lattice and subsequently bonded to the pallet are that the durability, as well as the overall strength and rigidity of the pallet is greatly increased. Additional reinforcing fillers, cylinders, pegs, etc. may be used in the cells of the lattice structure particularly in areas where fork lift tines bear against the lattice cell walls.

As another basic innovative feature of the new structural system, the invention also contemplates a new rigid paper partition structure going beyond the conventional parallelogram cell lattice structure presently manufactured by the paper and boxboard industry. According to this innovation, triangular cells are distributed throughout the lattice structure to impart rigidity to the otherwise collapsible parallelogram cell lattice formed by two sets of parallel intersecting partition elements. In this aspect of the invention, three sets of parallel partition elements are employed, including a first set of parallel elongate partition elements with periodic slits formed in both sides of said elements at regular intervals. That is the first, or base, set of parallel elongate elements has opposing slots formed on both sides of each element at regular intervals. A second set of partition elements with slits formed on one side at regular intervals engages and intersects the first set to define the conventional lattice structure of parallelogram cell. In addition, however, a third set of parallel partition elements with slits formed at regular intervals on one side engages and intersects the elements of the first set on the other side from the second set, whereby the third set bisects at least some of the parallelogram cells to distribute triangular cells throughout the lattice structure thereby imparting rigidity to the paper partition lattice structure.

A feature and advantage of this new rigid paper partition cellular lattice structure is that the lattice may be used in any state of relative collapse along a spectrum from rectangular cells to flattened partition elements by varying the angles of the parallelogram cells formed by the first and second partition elements over a continuous range from zero to right angle before adding the third set of parallel partition elements to rigidify the structure. Thus, the spacing of the slits at regular intervals formed in the third set of parallel partition elements is preselected over a variable range from near total collapse up to the length of the diagonal of the rectangular cell in order to rigidify the lattice structure at the desired state of collapse. The advantage of this feature is that the density of material may therefore also be varied over a wide range to vary the bearing strength of the resulting structure. The new and improved paperboard cellular lattice structure with triangular cells for rigidity can then be transformed into the paper network and plastic interpenetrating composite described above and into other applications of the structural systems and methods of the present invention. For example, it is particularly applicable for use as legs in pallet structures and in building materials.

It is apparent that many other applications of the structural system and method of the present invention are possible in addition to pallets and industrial platforms; for example, in wall board, furniture, doors, ceilings, prefab structures and other building structures. Other objects, features and advantages of the many facets of the invention will become apparent in the following specification and accompanying drawings.

PRIOR ART STATEMENTS

The use of a cellular lattice structure per se in pallet construction is not new. U.S. Pat. No. 3,691,965 describes a pallet consisting essentially of a lattice of orthogonal longitudinal and cross ribs defining rectangular cells for the structural body of a pallet. This patent, however, contemplates a unitary structure molded of plastic according to conventional plastic molding methods. Other plastic pallet patents such as U.S. Pat. No. 4,013,021 also appear to incorporate cellular lattice structures in one form or another, but such patents again contemplate a conventionally molded solid plastic pallet of considerable expense.

Cellular lattice structures arising from the use of partition elements is described in U.S. Pat. No. 3,752,089 directed to a load bearing structure made of corrugated cardboard. According to this disclosure, intersecting strip blanks form a grid of rectangular cells whose rigidity is then maintained by scored and folded cardboard elements inserted in the cells of the latticework. Polymerized composite material structures and weld-joints are not contemplated here, nor are they in paperboard and cardboard pallets as described in U.S. Pat. No. 2,925,947 for collapsible pallets, U.S. Pat. No. 2,908,464 for pallets easily assembled from fold out parts, and U.S. Pat. No. 3,131,656 for pallets assembled from interlocking and cooperating blanks scored and folded from slotted flat sheets. Many honeycomb pallet structures are described in the prior art such as U.S. Pat. Nos. 3,709,161; 3,248,275; and 3,079,876. But a primary object of the present invention is to avoid the expense of honeycomb material.

U.S. Pat. No. 3,880,092 describes a pallet of rigid foamed plastic coated over a wooden core or substrate. This wooden frame is placed in a conventional mold and the foamed plastic is deposited in the mold around the frame. Thus, there is no disclosure of an interpenetrating cellulosic and plastic composite base material with bonding laminations and weldments as contemplated by the present invention.

In situ polymerization to provide a coupled composite of a polymer and a porous cellulosic material is described in U.S. Pat. No. 3,765,934. Partial as well as complete impregnation filling all or substantially all of the voids in the porous cellulosic material with a polymerizable complex is set forth in this patent specification by way of a number of examples, including examples, in which chemical bonds are formed between the polymer and the wood. This patent contemplates an impregnated wood substrate and polymer wood composites for the manufacture of plywood. However, instructive examples of saturation and in situ polymerization of a porous cellulosic substrate are described.

Other examples of plastic and wood composites are described in U.S. Pat. No. 4,057,658 for a method of impregnating wood with plastics; U.S. Pat. No. 3,494,826 for polymer bonded cellulose and its preparations; and U.S. Pat. No. 2,298,017 for a process for plasticizing ligno-cellulosic materials. U.S. Pat. No. 2,434,106 describes the impregnation of paper material with styrene resins in a solvent with a number of examples while other examples of polymerization process for treating penetrable receptive substrates of varied nature and described in U.S. Pat. No. 3,466,182. U.S. Pat. No. 3,936,542 for methods of controlling migration of synthetic resins applied to porous materials has as its objective the prevention of saturation, impregnation and migration in the porous or absorbent substrate material, just the opposite of the present invention.

None of these foregoing patents, however, contemplates the treatment of intersecting or interlocking partition elements of cellulosic, fibrous or absorbent material by impregnation, saturation and in situ polymerization amounting to "saturation casting" throughout a substrate which functions as a "ubiquitous mold" to form interpenetrating substrate material and plastic composites for cellular lattice structural systems; nor do they contemplate adherent and chemically bonded cross-linked laminate layers upon the composite base to build up structural properties and form bonded laminate weldments, weld-joint, or fillets at the angular intersections of the partition elements. Nor do the patents contemplate incorporation of such novel structural systems into pallet structures, industrial platforms and other structural applications as contemplated by the present invention. Only certain isolated elements or features of the present invention are presented in isolation in the foregoing described patents. In addition, U.S. Pat. Nos. 3,711,314 and 2,468,086 describe a technique of imparting opposite polar anionic/cationic characteristics to adjacent laminates to increase adherence and bonding. However, this ad hoc assemblage of only some of the elements of the systems and methods described herein do not lead one skilled in the art to the present unobvious synthesis of these and additional elements as taught herein above and in the following detailed description with reference to the drawings.

BRIEF DESCRIPTION OF THE DRAWINGS

FIGS. 1A and 1B are fragmentary diagrammatic views from below of the pallet structure showing some optional reinforcing features which may be added alone or in combination in the pallet structure to increase durability for rough handling, etc.

FIGS. 2A and 2B are fragmentary side views of the pallet structure showing structural partition elements inserted and incorporated into the legs of the pallet structure for floor skids, tine guards, side guards and strap bracing.

FIG. 2C is a plan view of a double sided partition element with score lines for folding into a plastic filled runner or strapping or binding guard.

FIG. 2D is a perspective view of a plastic filled folded partition element runner or reinforcing element.

FIG. 3 is a perspective view of the pallet structure showing optional channels in the legs for converting the two-way pallet into a four-way pallet.

DESCRIPTION OF THE PREFERRED EMBODIMENTS

Figure 1:
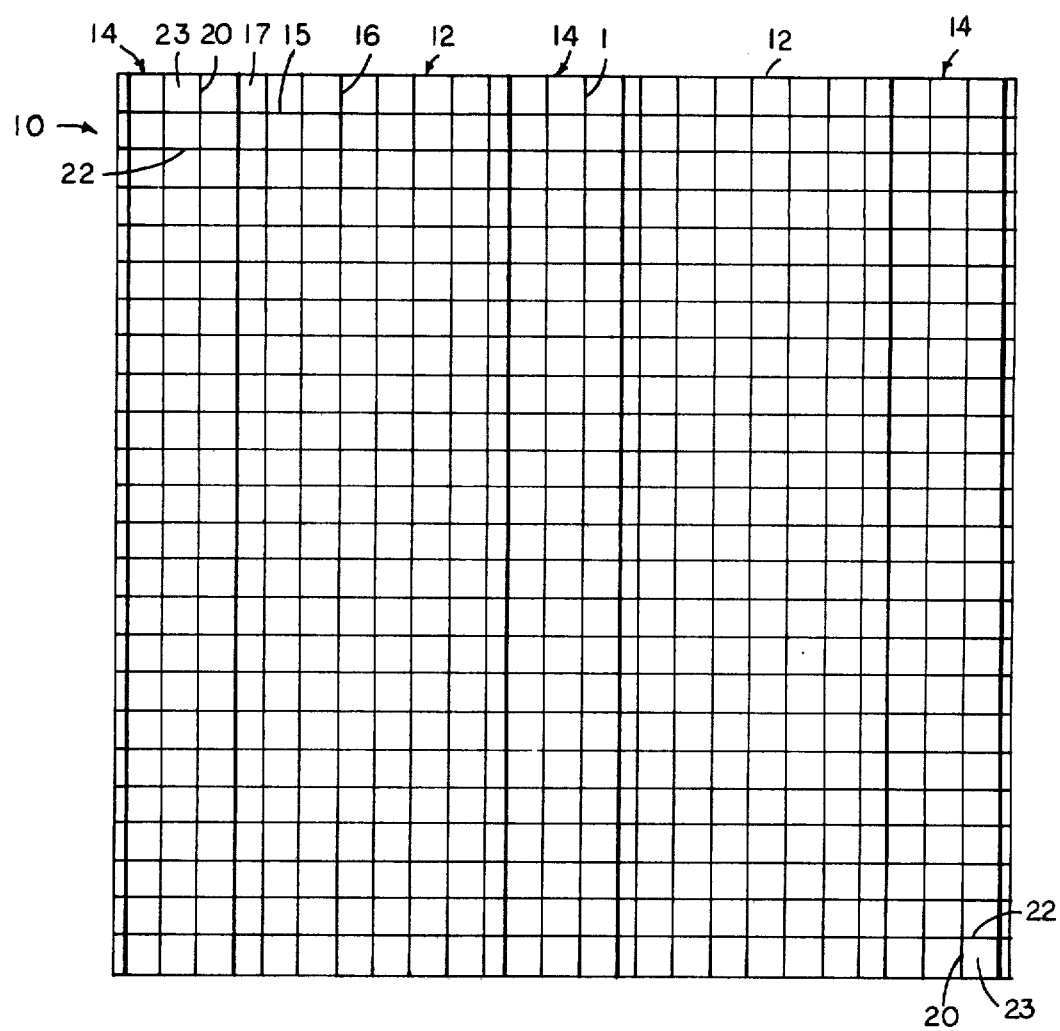
FIG. 1 is a diagrammatic plan view from below of a pallet structure with cellular lattice structural core, all constructed in accordance with the present invention.

In the embodiment of the present invention illustrated in FIGS. 1–8 there is shown a pallet 10 whose structural core consists of the cellular lattice structural system of the present invention formed generally into a load bearing deck 12 and three parallel spaced longitudinal legs 14 which support the deck above ground to permit entry of fork lift tines between legs. In this case the deck is formed by two parallel sets of intersecting or interlocking partition elements 15 & 16 defining parallelogram cells 17. The two parallel sets meet orthogonally to define rectangular cells. The cell size may vary over a considerable range depending upon the density of material and deck strength required to "bridge" the space between legs. In a typical application the cell size might be for example 2" by 2½" with a deck height or thickness of 1⅜".

Figure 4:
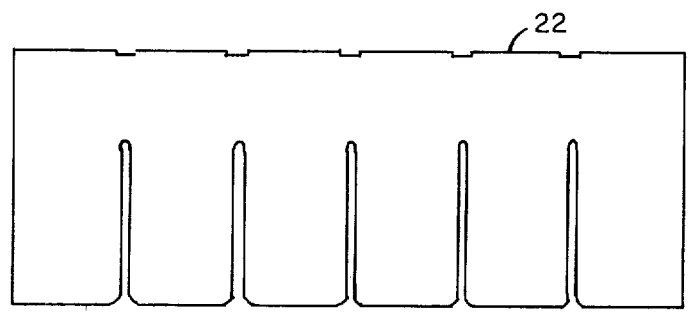
FIGS. 4, 5 & 6 are plan views of partition elements which are assembled in intersecting parallel sets to provide the cellular lattice substrate incorporated in the structures and methods of the present invention.
Figure 5:
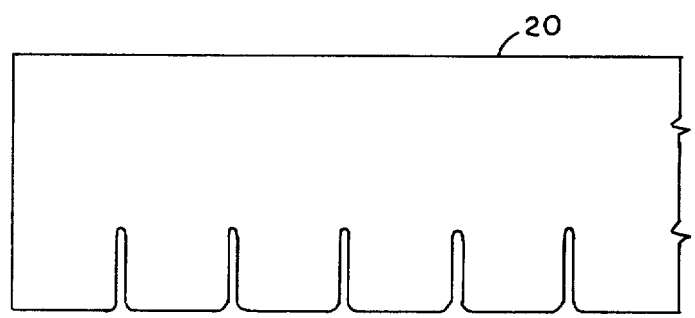
Figure 6:
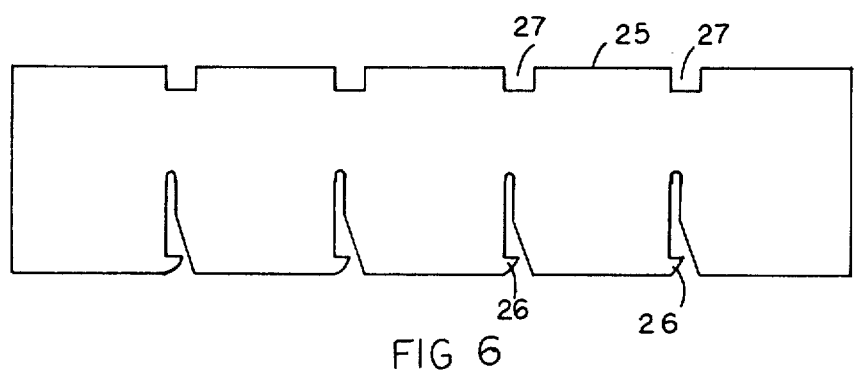

Similarly, the legs 14 are formed by two orthogonally intersecting sets of partition elements in this case long partition elements 20 and shorter elements 22 defining parallelogram rectangular cells 23. Such partition elements are shown in further detail unassembled in FIGS. 4 & 5. The partition height and leg height may be, for example, 4½". Partition lengths are determined by overall pallet dimensions which may vary typically from 48"×48" to 48"×42" and 48" by 40" and also 42"×48" and 40" by 48" where the first number is the length of the longitudinal direction of the leg by convention. Thus, for a typical leg size 48" long, by 4½" height, by 6" width, partition element 20 would be 48" long by 4½" high. If partition element 22 were 12" long one half of it would be used, cut before or after assembly as hereafter described. While partition elements 22 and 20 illustrated in FIGS. 4 & 5 are assembled by intersecting slot into slot, sets of mating interlocking partition elements of the type shown in FIG. 6 may also be used. Such interlocking partitions 25 are formed with locking tabs 26 at the top of the mating slots which engage and lock into the lock slot or back slot 27 of the mating partition elements.

Figure 7:
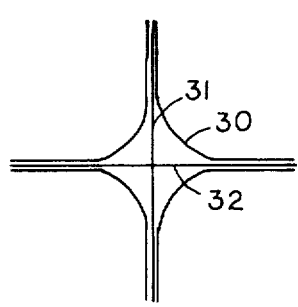
FIGS. 7 & 8 are diagrammatic plan views of intersecting joints of the cellular lattice structure after saturation, in situ polymerization, and subsequent lamination showing the plastic weldments, weld joints, or fillets imparting rigidity and strength to the cellular lattice structure of polymer and partition substrate interpenetrating composite material.
Figure 8:
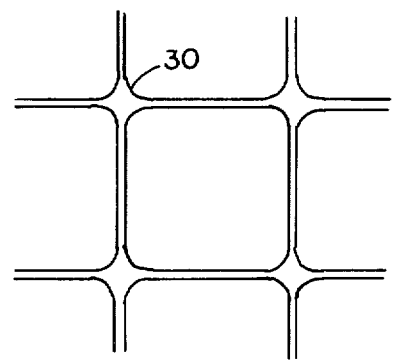

According to a preferred method of forming the cellular lattice structure, the legs and deck are assembled separately. Thus partitions for the legs are assembled and partitions for the deck are assembled. The assembled partition elements are then immersed in the saturating polymer polyblend solvolysis system until the paperboard, chipboard or other fibrous or absorbent material of the partition elements is preferably thoroughly penetrated. After in situ polymerization or other polymerization and hardening of the interpenetrating substrate/polymer composite material, the legs and deck parts are nearly rigid and can be cut and trimmed, for example by sawing. The deck and legs are then clipped together, or otherwise temporarily held or maintained together in place for a first coating of the polyblend over the composite core or base. The polyblend may be of neutral characteristics to yield agglomerative characteristics during lamination process. As heretofore described, after dipping and removing the assembled deck and legs, the solvent of the coating polyblend softens a surface layer of the composite base to allow in situ polymerization and lamination of the first coating layer to the composite base material, physically adhering and chemically binding and cross linking the legs and decks together at points of contact. Additional interpolymerization and laminating coating layers further strengthen the assembly and in addition form agglomerative weldments 30 at any intersections between any partition elements 31 and 32 as illustrated in FIGS. 7 and 8. The result is a plastic welded reinforced cellular lattice structure of chemically bonded and cross linking laminations and fillets upon a composite interpenetrating network polymer/partition substrate base as illustrated in FIG. 8.

After assembly of the partition elements into a deck and legs, after saturation and in situ polymerization of the deck and legs to form the composite material deck base and leg bases, and after coating and lamination of the deck and legs maintained in position for bonding together to form the structural core of the pallet with plastic weldments, fillets or weld joints at all intersections, additional features are added to the pallet structure. Thus, as shown in FIGS. 2 and 3, a sheet of deck paper/polymer composite 35 is placed over and bonded to the upper surface of deck 12 covering the cells 17 (shown in FIG. 1) of the deck lattice and providing a continuous bearing surface for the load. This deck sheet is formed initially by saturation of paper such as paperboard, chipboard, kraft paper, etc. or other fibrous and or absorbent material such as veneer, fabrics, fiberglass or any other material suitable for a decking surface in the saturating polyblend followed by in situ polymerization. The composite sheet material is applied while still wet or liquified to the deck lattice for bonding by physical adherence and chemical cross-linking. Additional immersion as a unit further builds up fillets or weldments at the lines of intersection of the deck sheet 25 and deck core lattice walls, greatly increasing the strength of the pallet. A non-skid surface may also be imparted to the deck sheet by a final coating of a polyblend with a rubber content, i.e. proportions of butyl, butadiene, or butyrene content. Other non-skid surface, such as a grit surface as is known, may also be applied to the deck surface.

A sheet or membrane similar to deck sheet 35 can also be applied to the bottom of legs 14 to provide a flat continuous protective bearing surface 37, protecting the cell walls of the lattice from abrasion or distortion in handling.

As used in this specification the terms "interpolymerization" and "in situ interpolymerization" are intended to refer not only to the in situ polymerization which takes place within a particular coating or lamination or laminating layer, from a polyblend solute/solvent system and solvolysis system, but also the softening by solvent action of the previous layer or base by the next coating and the intermigration of monomer and polymer constituents across the boundary or interface followed by polymerization, chemical bonding, and cross linking between the layers affording overall a unitary laminate structure of great strength, tenacity and durability. Thus, "interpolymerization" refers to the intimate bonding and cross linking across boundary or interface layers of the resulting laminate structure, effected by the use of polyblends in a solute/solvent system with solvents appropriate to each plastic material of the polyblend; sufficiently liquified for complete saturation and in situ polymerization throughout the partition substrate in the initial composite formation, and adjusted for agglomerative fillet and intersection weldment formation in subsequent laminating steps. Other anionic/cationic adjustments can also be effected.

Figure 2:
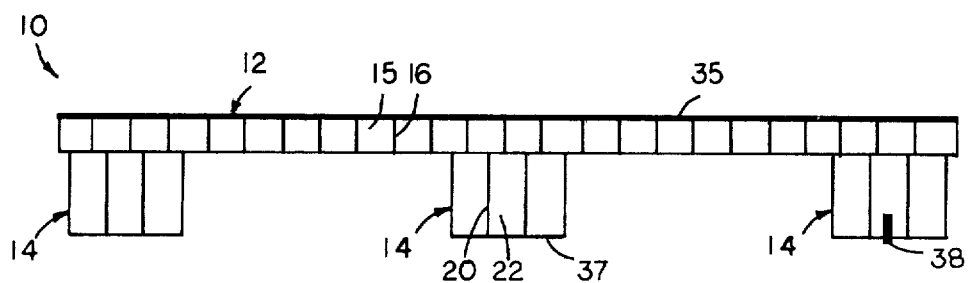
FIG. 2 is a side view of the pallet structure again showing some optional features for reinforcement.

A number of variations on the basic pallet of FIGS. 1 & 2 are shown in FIGS. 1A, 1B, and 2A–E. Thus FIGS. 2A & 2B show the pallet legs reinforced by tine guards and floor skids. The floor runners or skids 40 and the tine guard 41 are partition elements specially prepared from wood or other structural material of sufficient thickness to serve the structural purposes hereafter described. In this example, the wood partition elements would be 48 inches long with slots formed at regular intervals for intersecting and engaging the cell walls along the length of a leg. Thus the appearance of such wood partition elements is similar to that illustrated with respect to FIGS. 4 and 5. These reinforcing wood partition elements have a height and slot length sufficient to penetrate in the cellular lattice structure and project beyond the lattice any desired or suitable distance, for example ⅛ to ¼ inch. Reinforcing wood partition elements inserted from below into the legs form runners or skids 40, while those inserted from the side of the legs form tine guards or side guards 41, all of which protect the composite material lattice structure during rough handling and increase the durability and life of the pallet. The tine guards and side guards 41 and runners or skids 40 offer an additional advantage where straps 42 are to be used to tie or bind goods to the pallet. Thus, they protect the composite material lattice structure from cutting action by the strap, distributing the strap pressure over a larger and more rigid surface.

Another alternative is shown in the right hand leg of the pallet as illustrated in FIG. 2 and FIG. 1B. In this arrangement a single runner 38 is inserted the length of the leg along the middle, raising the cellular lattice structure slightly off the ground and protecting it from abrasion. It is apparent that wooden reinforcing partition elements can be inserted in a variety of locations to increase the durability of the pallet. In each case the wooden element can be inserted before coating, or at an intermediate coating to physically bond and chemically bind and cross link the reinforcing element to the overall structure, strengthening and further rigidifying cell walls of the lattice in the vicinity of the structural partition element and offering runners, skids, tine guards and side guards where appropriate and required by the uses involved.

Another arrangement for runners or skids is illustrated in FIGS. 2C & 2D. In this approach, a double sided folding partition element 47 is scored and folded along lines 49 to form a folded partition plastic filled runner 50. After folding, the runner is filled with a plastic and filler material which may include a filler of beaten or shredded paper, for example, waste paper fragments from the paper partition manufacturing process, or sawdust, or wood, plastic, and any other suitable filler material. The resulting runner may then be inserted into, and engage, the cell walls of the pallet legs to provide durable runners or skids. Further laminations bond the runner to the pallet structure as heretofore described. Thus, this type of runner also protects the composite material lattice structure from a cutting action of the strap or binding distributing the strap or binding pressure over a larger surface.

Figure 2E:
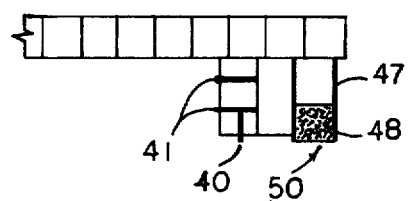
FIG. 2E is a fragmentary side view of the pallet structure incorporating into the leg a runner of the type shown in FIG. 2D.

Incorporation of such a runner 50 into leg 14 of the pallet is shown in FIG. 2E where the runner 50 is inserted into the outer row of cells in the leg lattice while side guards 41 and floor skid 40 are inserted and incorporated into the inside row of the leg.

FIGS. 1A and 1B show some additional means for pallet structure reinforcement. In FIG. 1A, cups or cylinder segments of paper material, or any other material suitable for reinforcement, are inserted into some of the cells of the lattice. Additional coatings or laminations effected by dipping the structure into a polymer polyblend solvolysis system, incorporate such reinforcing cups or cylinder elements into the structural core by physical adhesion and chemical binding, increasing the material density and strength of the pallet structure. Such cups or cylinders, as well as the wooden partition elements heretofore described, may be pretreated by solvolysis system saturation and in situ polymerization to form the stronger composite material as described with reference to the partition elements. Other materials such as wooden pegs or any other load bearing materials and supports can be incorporated into the pallet structure and bonded into the unitary laminated structure without limitation to the particular examples enumerated here.

In FIG. 1B, reinforcement has been added in the area of the undersurface of the deck where the tines of a fork lift truck bear, to raise the deck and supported load. Such reinforcement has been effected by filling the pertinent cells of the deck 12, that is, cells against which the fork lift tines will bear, with a plastic and filler mixture. The plastic may be derived from the same polyblend as the saturating and coating solvolysis systems used in forming the laminate structure, with a filler of beaten or shredded paper fragments such as derived from waste paper in box manufacturing or any other suitable filler material. The plastic and beaten paper fragment composite filler 45 is polymerized and hardened either within the appropriate cells or separately forming the reinforced area on the undersurface of the deck. Such reinforcement might also be effected by inserting a plurality of wooden partition elements in the undersurface of the deck in the manner heretofore described, with reference to the runners or skids 40 and tine guards and side guards 41, illustrated with reference to the legs in FIGS. 2A and 2B. Similarly, folded partition plastic filled elements 50 of the type illustrated in FIGS. 2C and 2D might also be used to strengthen the undersurface of the deck where tines bear. A sheet or membrane similar to deck sheet 35 can also be applied to the undersurface of the deck. Any other means for reinforcing the undersurface of the deck such as wooden pegs, plastic tubes, etc. may also be used.

In making pallets according to the present invention, the deck portions and leg portions are frequently assembled separately and then joined as heretofore described. As a result, the cell structure of the legs is usually not aligned with the cell structure of the deck, as shown more clearly in the offset juncture between the legs and deck in FIGS. 2A, 2B, and 2E. It would certainly be possible, however, to manufacture partition elements of full size and form to be assembled into the pallet according to its final shape, in one piece without first assembling separate parts or portions which are then joined together to give the final pallet shape. The assembling of separate parts, however, offers advantages in manufacturing and handling.

A perspective view of the pallet illustrated with reference to FIGS. 1-8 is shown in FIG. 3. The perspective view indicates how the pallet, initially a two-way pallet, may be converted into and four-way pallet so that tines of a fork lift truck may enter below the deck from any side to raise the pallet and its supported load. Such conversion is effected by cutouts leaving channels 52 through the sides of the legs 14 where the fork lift tines can enter. The roof 53 of the channels 52, being the undersurfaces of the legs in the cutout regions are lined with deck paper or membrane, heretofore described with reference to the deck surface sheet 35. Thus deck type paper saturated with the polyblend in a solvent system and polymerized in situ is bonded to the roof 53 of the channels 52 by laminations and weldments covering the cells of the lattice and protecting the cell walls from abrasions and distortion by the lifting tines.

Figure 11:
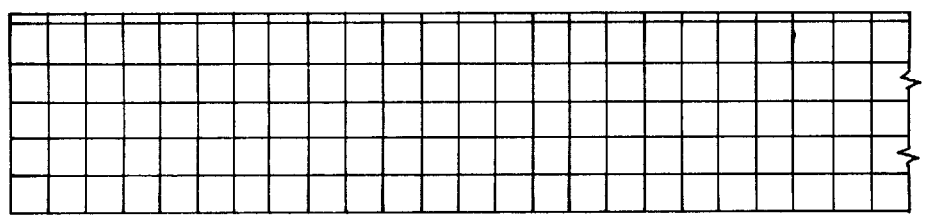
FIGS. 11, 12, & 13 are a plan view, end view turned up, and side view of an elongate pallet leg structure with smaller cells, higher density of material and greater compressive strength.
Figure 12:
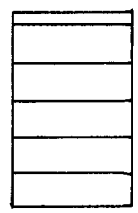
Figure 13:
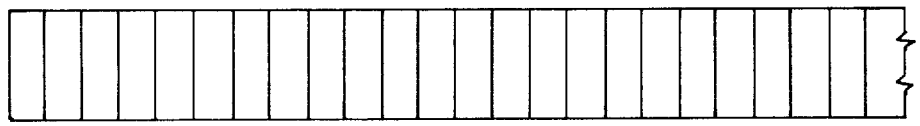
Figure 9:
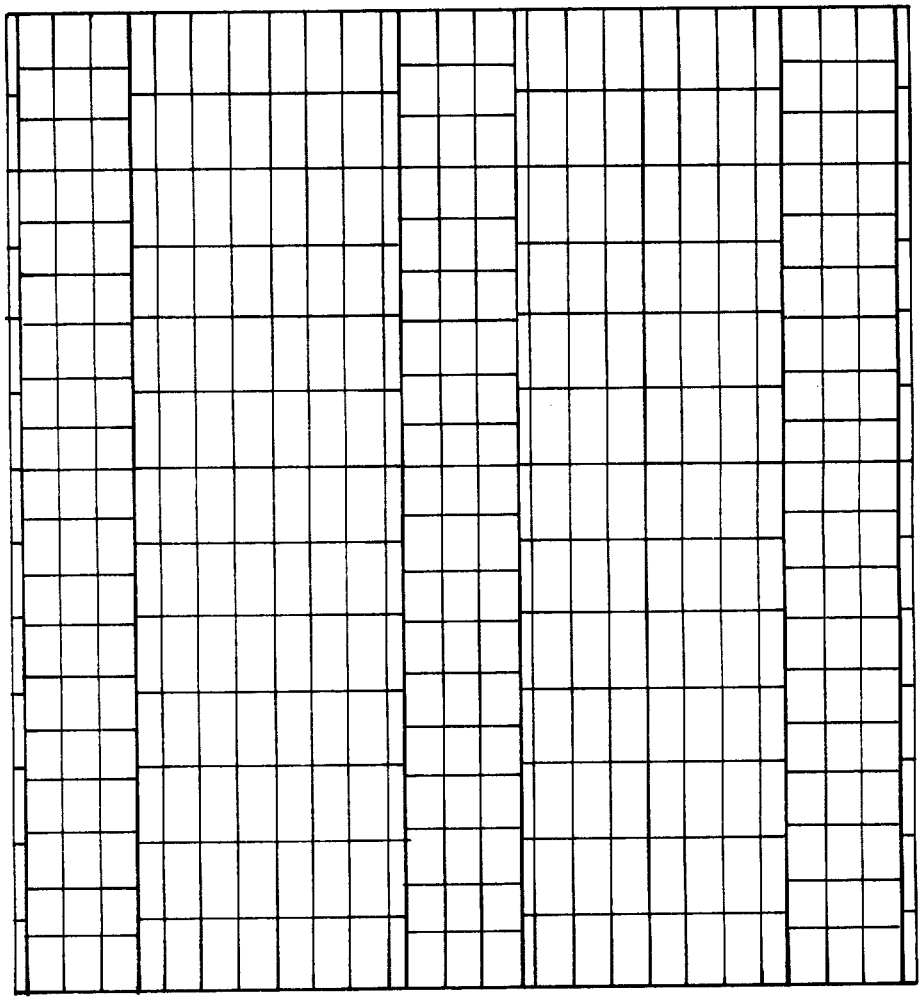
FIGS. 9 & 10 are diagrammatic views from the bottom and side, respectively, of another pallet structure arrangement and configuration according to the present invention.
Figure 10:
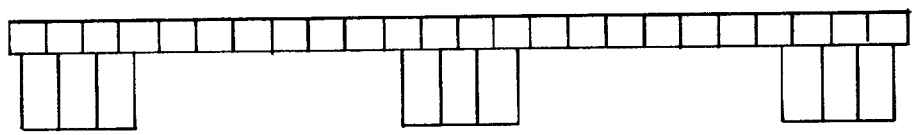

As is apparent from the nature of the structural system of the present invention, it can be manifested in a variety of formats and dimensions in pallet structures and industrial platforms. Thus, as shown in the pallet embodiment of FIGS. 9 and 10 a variety of cell sizes may be incorporated into the cellular lattice and the cell size of the legs may differ from the cell size of the deck lattice. In fact, in some instances for greater strength, it is advantageous to form the legs of higher density cells as shown in the leg illustrated in FIGS. 11 through 13. In that example, a smaller cell size is utilized giving a higher density of material and higher density of cell walls for greater structural support. Thus, for a leg 48 inches long, by 4½ inches high, by 6 inches or 8 inches wide, 5 cells across are shown with an added strip on the edge for strength.

Figure 14:
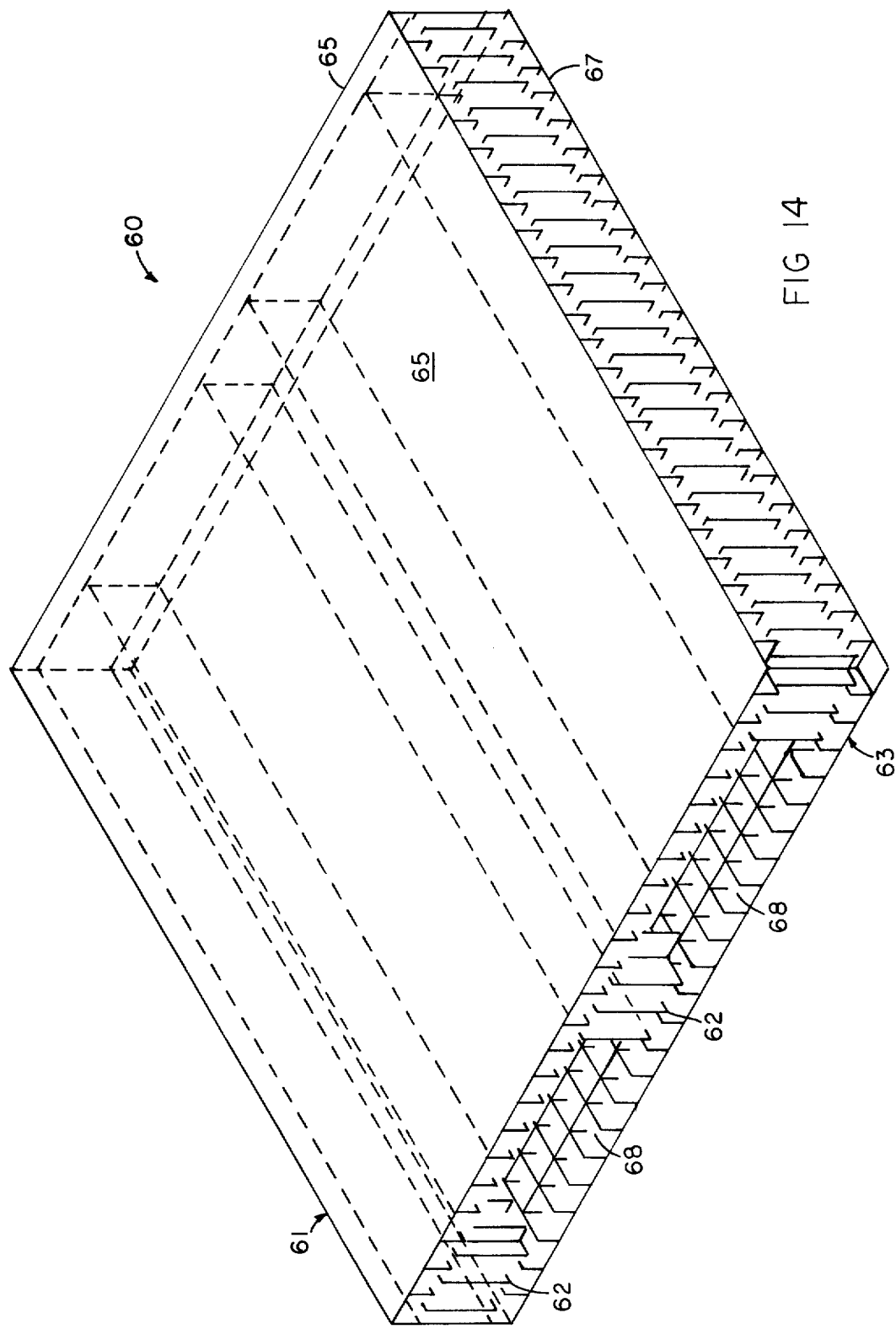
FIG. 14 is a perspective view of a reversible pallet structure constructed in a manner similar to that illustrated with reference to FIGS. 1 and 2 but with both upper and lower decks.

FIG. 14 is a perspective view of a pallet similar in structure to the one illustrated in FIGS. 1 and 2. However, the pallet in FIG. 14 is reversible. Thus the pallet 60 includes in addition to the upper deck 61 and legs 62, a lower deck 63. The upper and lower decks 61 and 63 are formed in the manner described with reference to FIGS. 1 and 2 consisting of the lattice structure covered by deck sheets or membranes 65 and 67. The legs 62 covered above and below by the upper and lower decks define the boundaries for the holes or openings which receive the tines of the fork lift truck. In all other respects the legs and decks are formed and joined as heretofore described. The various forms of reinforcement heretofore described may also be incorporated into this form of the pallet as they may be in others described herein.

Figure 15:
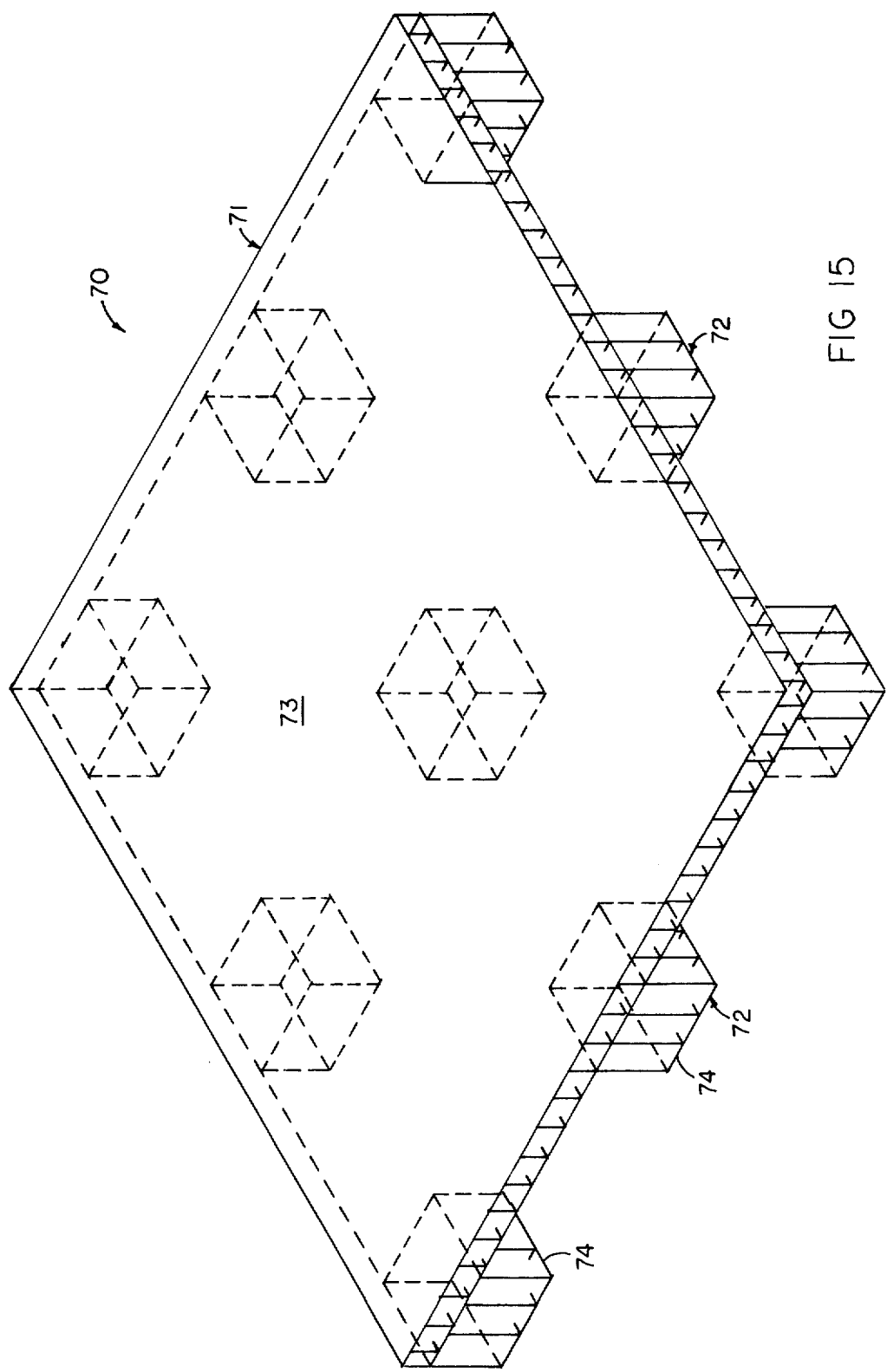
FIG. 15 is a perspective view of a four-way pallet constructed in accordance with the present invention including a deck and nine pedestals to permit entry of fork lift tines from any side of the pallet.
Figure 17:
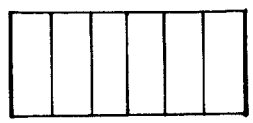
FIGS. 16, 17, & 18 are diagrammatic plan view, side view and end view turned up, respectively of a pedestal with smaller cell size and increased density of material with increased strength for incorporation into four-way pallets of the present invention.
Figure 16:
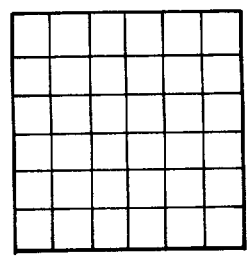
Figure 18:
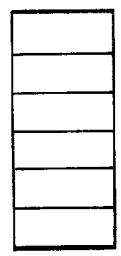

A four-way pallet based upon pedestals rather than elongate runners is illustrated in FIG. 15. In this embodiment the pallet 70 consists of a deck 71 and nine pedestals 72 all formed of the cellular lattice structure as heretofore described. The deck 71 is topped by a deck sheet 73 bonded to the lattice while the bottoms of the pedestals 72 are similarly covered by composite material membranes 74 welded to the pedestals at the lines of intersection of the membrane 74 and pedestal cell walls where agglomerative fillets accumulate. For greater strength, higher density of material may be incorporated in the pedestal by smaller cell size and higher cell density in the lattice as is illustrated in the pedestal for four-way pallets at FIGS. 16–18.

Figure 19:
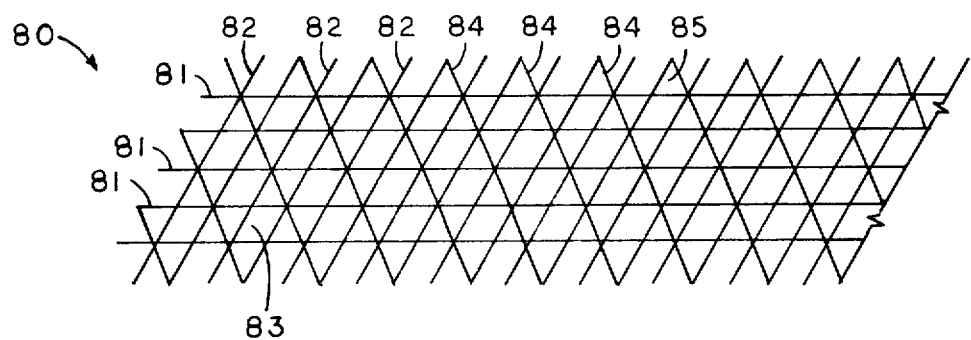
FIGS. 19 and 20 are diagrammatic plans for new and improved partition element lattice structures with three parallel sets of partition elements in intersecting relationship so at least some of the parallelogram cells of the conventional partition lattice are bisected to distribute triangular cells throughout the lattice and impart rigidity to the said lattice.
Figure 20:
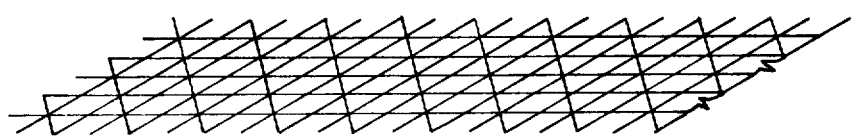

A novel and improved partition lattice structure for incorporation into the structural systems and methods of the present invention is illustrated with reference to FIGS. 19–22. In accordance with this aspect of the invention three sets of parallel partition elements are assembled in intersecting engaging relationship rather than two sets as is conventionally the case in partition assembly and box manufacture. Thus, as illustrated in FIGS. 19 and 20 the new structure 80 is formed by a first set of parallel partition elements 81 and a second set of parallel partition elements 82 which intersect with each other to form the parallelogram cells 83 as would occur in a conventional partition assemblage if it were skewed from orthogonality. However, in accordance with the present invention, a third set of parallel partition elements 84 is incorporated in the lattice to bisect at least some of the parallelogram cells and distribute triangular cells 85 throughout the lattice imparting rigidity to the lattice. The degree of skew in the lattice prior to insertion of a third set of partitions to introduce triangular cells and rigidity can be varied to vary the density of material in the lattice and hence compressive strength for different purposes as well as triangular to parallelogram. The ratio of triangular cells to parallelogram cells can also be varied to provide a range of rigidity and strength as required. Thus, for incorporation in a pallet leg, a degree of skew such as illustrated in FIG. 20 might be used to increase strength. Once assembled the partition substrate is processed and incorporated into the interpenetrating plastic and paper material composite as heretofore described, and processed into the laminated structural system. After the structure is saturated and the initial casting in situ is completed the hardened lattice may be cut to appropriate shape as required. Or, cutting may be effected after a later coating.

Figure 21:
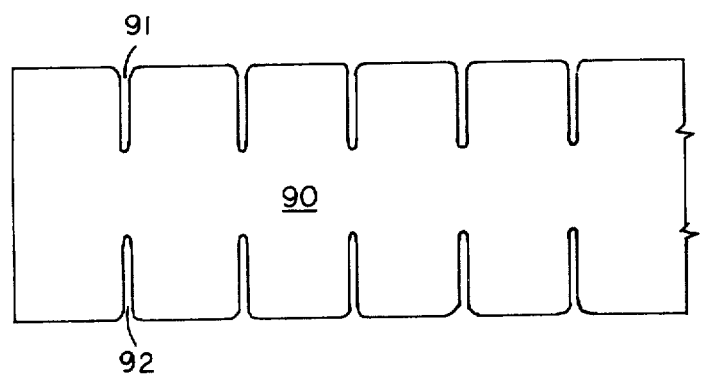
FIG. 21 is a plan view of a partition element with two sets of opposing slots at spaced intervals to receive two parallel sets of intersecting partitions, one set on each side, to form the new partition lattice illustrated in FIGS. 19 and 20.

In order to assemble three sets of partitions into a lattice substrate with triangular cells distributed through the lattice to impart rigidity, at least one set of partitions is of the form illustrated in FIG. 21 with two sets of opposing slits 91 and 92 on each side of the partition element 90 at spaced intervals. The other two sets of partitions may each be of the form form example, as illustrated in FIG. 4. Thus, as shown, the three sets of partition elements are formed of equal width and with slot configurations so that upon assembly, the tops and bottoms of the three sets coincide, defining lattice cell walls of co-extensive height.

Figure 22:
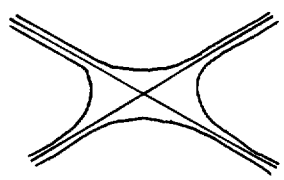
FIG. 22 is a diagrammatic plan view of the plastic weldment, weld joint or fillet at the intersection of two partition elements which are skewed or non-orthogonal and showing the thicker build up of agglomerating plastic in the acute angle over the obtuse angle.

When the partition elements are skewed, obtuse and acute angles are formed so that in subsequent polymerization steps weldments tend to thicken to an even greater extent in the acute angles than the obtuse as illustrated in FIG. 22. The extent of skew desired determines the spacing of the slots in the third set of partitions which will bisect some of the parallelogram cells to form triangular cells. In another form of the invention, the lattice structure may still be comprised of only two sets of partition elements intersecting to form a parallelogram lattice, but skewed to a desired degree and temporarily held in that configuration until saturated, polymerized in situ and hardened.

It is apparent that the structural system of the present invention and the preferred embodiments described herein have wide application beyond pallets and industrial platforms to other load bearing and structural applications such as for example, in building materials such as walls, ceilings, doors, etc; sporting equipment such as boats, skis, toboggans, etc; vehicles such as boats, automobiles, trucks, campers and recreational vehicles; and other applications.

I claim:

1. A new and improved monolithic structural system comprising:
    an interpenetrating substrate and plastic material cellular lattice composite comprising first and second phases, said composite characterized by intimate physical and chemical bonding between the phases;
    said first phase comprising a substrate of intersecting partitions of absorbent fiber-like material forming a continuous phase fibrous network filler, said intersecting partitions defining the cellular lattice;
    said second phase comprising a polymerized plastic material extending throughout and filling the voids and interstices of the fibrous network of the fiber-like material first phase, said second phase derived by in situ polymerization from a solvolysis system including at least a dissolved starting polymer substance and solvent in which the solvent reacts with the dissolved substance, said solvolysis system adapted for saturating and penetrating rather than merely coating the interstices and voids of the fiber-like material first phase, and for reacting and polymerizing throughout the fibrous network of the first phase;
    and at least one laminate coating of an agglomerating plastic material adherent and chemically bonding to the surface of said plastic material and substrate composite with thickened weld joints at the intersections of the substrate partitions, said at least one laminate coating derived by in situ polymerization from a similar solvolysis system adjusted to have agglomerative characteristics for coating rather than saturating, and for forming thickened weld joints or fillets at the intersections of the cellular lattice structure, said adjusted solvolysis system adapted to liquify the outer surface of the composite for chemical bonding and interpolymerization at the interface between the coating and the composite whereby said cellular lattice composite and at least one coating form a monolithic structural system.

2. A structural system as set forth in claim 1 wherein said first and second phases of the composite are of opposite ionic polarity to increase adhesion between the phases.

3. A structural system as set forth in claim 1 wherein cross-linking chemical bonds are formed at the interface between the two phases.

4. A structural system as set forth in claim 1 wherein said coating is formed with neutral polarity to provide the agglomerating characteristics while adhering and chemically bonding at the interface with the composite surface.

5. A monolithic structural system as set forth in claim 1 wherein said composite material cellular lattice is formed with a plurality of said coatings to provide a laminate monolithic structure of plural adhering and chemically cross-linking layers with interpolymerization at the interfaces between said plurality of coatings.

6. A method of forming a new and improved monolithic structural system comprising:
    assembling a plurality of substrate partition elements of absorbent fiber-like material into a cellular lattice substrate structure, said partition elements of absorbent fiber-like material forming a fibrous network phase;
    preparing a solvolysis system comprising plastic polymer forming solute materials with a solvent which also reacts with the solute materials, and sufficiently liquifying said solute materials in order to saturate the fibrous network phase;
    immersing said lattice structure substrate material in said saturating solvolysis system containing the polymerizable plastic material thereby saturating the substrate, filling the voids and interstices of the fibrous network of the absorbent fiber-like material and thus driving out air and gases;
    in situ polymerizing and casting said plastic materials from the solvolysis system upon and throughout the fibrous network of said cellular lattice substrate in order to form a relatively tough and rigid composite material lattice cellular structure of two interpenetrating phases, a continuous substrate phase and an interpenetrating polymerized plastic phase characterized by intimate contact and chemical bonding at the interface between the phases, said substrate phase functioning as a casting network during formation of the structural system and said plastic phase reacting and polymerizing in situ throughout the fibrous network of the cellular lattice substrate phase;
    adjusting said solvolysis system to impart agglomerative characteristics for coating rather than saturating;
    coating the plastic material and substrate composite with a layer from said adjusted solvolysis system thus liquifying the surface of the composite for interpolymerization at the interface of the composite and the coating layer, said coating material also thickening at intersections of the cellular lattice structure as a result of the agglomerative characteristics;
    and in situ polymerizing said coating to form a monolithic laminate structural system with weld joints or fillets at the cellular lattice intersections and with chemical bonding by interpolymerization at the interface of the cellular lattice composite and the coating layer.

7. A method of forming a structural system as set forth in claim 6 including the step of coating and laminating said composite structure with a plurality of coating layers each in situ polymerized from said adjusted solvolysis system for adhering and chemically bonding to the previous layer and building up the plastic weld joint fillets at the intersections of the cellular lattice monolithic structure.

8. A method of forming a structural system as set forth in claim 6 wherein is included the step of inserting reinforcing means into the cellular lattice structure prior to the laminating steps.

9. A method of forming a structural system as set forth in claim 6 wherein is included the step of adjusting the ionic polarity of the saturating solvolysis system of polymerizable plastic material or the laminating adjusted solvolysis system of polymerizable plastic material to enhance bonding across boundary layer interfaces.

10. A method of casting a structural system comprising:
   assembling a plurality of partition elements of absorbent fiber-like material into a cellular lattice substrate structure, said cellular lattice structure forming a fibrous network phase;
   combining a blend of plastic polymer materials in a solvolysis system and liquifying said plastic polymers, reducing cis and trans chains by solvent action sufficiently to permit migration of monomer and polymer fragments throughout the fibrous network structure of the partition material, said plastic polymers selected to yield a polyblend phase of tough, rigid, hard, high impact, high compressive strength heterogenous polymers with chemical binding between the phases, said solvolysis system including at least one solvent which also reacts with the plastic polymers;
   immersing said partition material lattice structure in the liquified polymer blend and saturating the material so that the solvolysis system including the plastic polymer blend penetrates and fills the voids and interstices of the fibrous network structure of the cellular lattice partition material driving out the air and gases;
   in situ polymerizing and casting the polymer blend from the solvolysis system upon and throughout the absorbent fiber-like material of the cellular lattice substrate to form a relatively rigid, hard, tough and high impact and high compressive strength plastic and partition material interpenetrating network composite, said composite having a surface skin rich in the polymer blend and a core of good interpenetration and physical and chemical bonding between the two phases, the continuous fibrous material substrate phase formed by the cellular lattice partition substrate and the interpenetrating polymerized plastic phase derived by in situ polymerization from the solvolysis system, said composite characterized by intimate contact and chemical bonding between the phases, said substrate phase functioning as a casting network during formation of the structural system, and said solvolysis system of dissolved plastic polymers and reactive solvent penetrating, reacting and polymerizing throughout the fibrous network of the cellular lattice fiber-like partition material.

11. A method of casting as set forth in claim 10 wherein said partition elements are assembled to form a parallelogam cell lattice structure with a plurality of triangular cells interspersed through the lattice to impart rigidity.

12. A method of casting as set forth in claim 11 wherein is also included the steps of:
   adjusting said solvolysis system to have agglomerative characteristics for coating rather than saturating;
   coating the plastic material and substrate composite with a layer from said adjusted solvolysis system thus liquifying the surface of the composite for interpolymerization at the interface of the composite and the coating layer, said coating material also thickening at intersections of the cellular lattice structure as a result of the agglomerative characteristics;
   and in situ polymerizing said coating to form a monolithic laminate structural system with weld joints or fillets at the cellular lattice intersections and with chemical bonding by interpolymerization at the interface of the cellular lattice composite and the layer.

13. A method of casting a structural system as set forth in claim 11 wherein is also included the step of laminating said composite lattice structure with at least one coating of polymerizable plastic material derived by in situ polymerization from a solvolysis system adjusted to have agglomerative characteristics, said coating adherent to and chemically binding with the composite surface, said coating with agglomerative characteristics forming weld joint fillets at the cell lattice intersections.

14. A method of casting a structural system as set forth in claim 11 including the step of accelerating the in situ polymerization by elevating the temperature, however maintaining the temperature below the temperature of gasification or creation of bubbles.

15. A pallet structure of the type having a deck for supporting a load, and legs spacing the deck from ground to permit entry of fork lift tines for lifting the pallet and supported load, said deck affording a bridge across the legs, the improvement comprising:
   said deck and legs comprised of an interpenetrating network composite including two phases, a first phase comprising a substrate of intersecting partitions of absorbent fiber-like material forming a continuous phase fibrous network said intersecting partitions defining a cellular lattice, and a second phase comprising a polymerized plastic material extending throughout and filling the voids and interstices of the fibrous network of the fiber-like material first phase, said second phase derived by in situ polymerization from a solvolysis system including at least a dissolved starting polymer substance and solvent in which the solvent reacts with the dissolved substance, said solvolysis system adapted for saturating and penetrating rather than merely coating the interstices and voids of the fiber-like material first phase, and for reacting and polymerizing throughout the fibrous network of the first phase;
   said deck and legs comprised of the interpenetrating composite of fiber-like material and plastic material also formed with at least one laminate coating of an agglomerating plastic material adherent and chemically bonding to the surface of said plastic material and substrate composite and forming thickened weld joints at the intersections of the substrate partitions, said at least one laminate coating derived by in situ polymerization from a similar solvolysis system adjusted to have agglomerative characteristics for coating rather than saturating, and for forming thickened weld joints or fillets at the intersections of the cellular lattice structure, said adjusted solvolysis system adapted to liquify the outer surface of the composite for chemical bonding and interpolymerization between the coating and the composite said at least one coating formed over the deck and legs as a whole, whereby said cellular lattice composite and at least one coating form a monolithic pallet structure.

16. A pallet structure as set forth in claim 15 wherein said deck is formed with a continuous flat deck surface covering the lattice structure, said surface comprising a sheet substrate and plastic material composite of two phases, a first phase comprising a flat sheet of absorbent fiber-like material and a second phase of relatively hard and rigid polymerized plastic filling the voids and interstices of the absorbent material structure said second phase derived by in situ polymerization from a solvolysis system penetrating and filling the voids and interstices of the first phase, said composite sheet joined to the lattice structure of the deck by at least one coating of adhesive plastic with agglomerating characteristics forming gussets at the lines of contact between the sheet and lattice cell walls.

17. A pallet structure as set forth in claim 15 wherein reinforcing elements are incorporated into the cellular lattice structure by said at least one coating.

18. A new and improved pallet structure comprising:
a flat cellular lattice deck comprised of a plastic and substrate material composite including two phases, a first phase comprising a substrate of intersecting partitions of absorbent fiber-like material forming a continuous phase fibrous network, said intersecting partitions defining a cellular lattice, and a second phase comprising a polymerized plastic material extending throughout and filling the voids and interstices of the fibrous network of the fiber-like material first phase, said second phase derived by in situ polymerization from a solvolysis system including at least a dissolved starting polymer substance and solvent in which the solvent reacts with the dissolved substance, said solvolysis system adapted for saturating and penetrating rather than merely coating the interstices and voids of the fiber-like material first phase, and for reacting and polymerizing throughout the fibrous network of the first phase;
a set of legs comprised of the same material composite as the deck;
said legs coupled to the undersurface of the deck by a plurality of adherent and chemically bound plastic coatings covering the material composite cellular lattice structure of the deck and legs, said coatings also having agglomerative or aggregative characteristics forming agglomerative welds or fillets at the intersections of the partitions thereby imparting strength to the structure, each said coating derived by in situ polymerization from a similar solvolysis system adjusted to have agglomerative characteristics for coating rather than saturating, and for forming thickened weld joints or fillets at the intersections of the cellular lattice structure, said adjusted solvolysis system adapted to liquify the outer surface of the composite for chemical bonding and interpolymerization between the coating and the composite said at least one coating formed over the deck and legs as a whole, whereby said cellular lattice composite and at least one coating from a monolithic pallet structure;
said deck formed with a continuous flat deck surface covering the lattice structure, said surface comprising a sheet substrate and plastic material composite of two phases, a first phase comprising a flat sheet of absorbent fiber-like material and a second phase of relatively hard and rigid polymerized plastic filling the voids and interstices of the absorbent material structure, said second phase derived by in situ polymerization from a solvolysis system penetrating and filling the voids and interstices of the first phase, said composite sheet joined to the lattice structure of the deck by at least one coating of adhesive plastic with agglomerating characteristics forming fillets at the lines of contact between the sheet and lattice cell walls, said coating derived by in situ polymerization from said adjusted solvolysis system.

19. A new and improved pallet structure as set forth in claim 18 in which is also included a set of partition elements of structural material for reinforcing the pallet structure, said additional partition elements inserted from below into the cell walls of the legs and formed to extend beyond the cell walls of the lattice structure to provide floor skids or runners.

20. A pallet structure as set forth in claim 18 wherein is also included a set of partition elements of structural material inserted into the sides of the legs and engaging the cell walls of the lattice structure of the legs, said additional structural partition elements formed to extend beyond the cell walls of the lattice structure of the legs to provide tine guards, tine deflectors, or side guards.

21. A pallet structure as set forth in claim 18 wherein selected cells of the lattice structure of the deck between the legs are filled with plastic material filler to reinforce the cellular lattice structure in the area where fork lift tines bear against the under surface of the deck when lifting the pallet and supported load, said plastic filler material derived by in situ polymerization from a polyblend solvolysis system mixed with a filler of shredded fibrous material, said polyblend and shredded fibrous material forming a high impact composite filler material.

22. A pallet structure as set forth in claim 18 wherein cylinder elements each a fibrous substrate and interpenetrating polymerized plastic composite are inserted into the cells of the lattice structure and incorporated into the composite laminations to reinforce the pallet structure.

23. A pallet structure as set forth in claim 18 wherein are also included a set of reinforcing elements each comprised of a double sided partition element scored, folded and filled with plastic filler material for engaging the cell walls of the lattice structure at desired location.

24. A pallet structure as set forth in claim 23 wherein said plastic filled double sided folded partition reinforcing elements are incorporated in the bottom of the legs as runners.

25. A method of forming a new and improved monolithic light-weight pallet structures from solvolysis reactions involving plastic polymer forming substances and materials in solution in which at least one solvent reacts with the polymerizable substances in solution to form new products said pallet structure of the kind having a load bearing deck and legs spacing the deck above the ground or surface comprising:
- assembling a plurality of substrate partition elements of absorbent fiber-like material into cellular lattice substrate structures for the deck and legs said partition elements of absorbent fiber-like material forming a fibrous network filler phase;
- preparing a solvolysis system of plastic polymer forming solute material and a solvent which also reacts with the plastic material, and sufficiently liquifying said solvolysis system for saturating the fibrous network filler phase;
- saturating said lattice structure substrate material forming the deck and legs in said saturating solvolysis system containing the polymerizable plastic material and reacting solvent and filling the voids and interstices of the fibrous network of the absorbent fiber-like material of the deck and legs driving out air and gases;
- in situ polymerizing and casting said plastic materials from the solvolysis system upon and throughout the fibrous network of the cellular lattice substrate of the deck and legs to form a relatively tough and rigid composite material lattice cellular structure of two interpenetrating polymerized plastic phases characterized by intimate contact and chemical bonding between the phases, said substrate phase functioning as a casting network during formation of the structural system and said plastic phase reacting and polymerizing from the solvolysis system throughout the fibrous network of the cellular lattice substrate phase;
- adjusting said solvolysis system to have agglomerative characteristics for coating rather than saturating;
- assembling the deck and legs in pallet structure position;
- coating the plastic material and substrate composite with a layer from said adjusted solvolysis system thus liquifying the surface of the composite for interpolymerization at the interface of the composite and the coating layer, said coating material also thickening at intersections of the cellular lattice structure as a result of the agglomerative characteristics;
- and in situ polymerizing said coating to form a monolithic laminate structural system with weld joints or fillets at the cellular lattice intersections and with chemical bonding by interpolymerization at the interface of the cellular lattice composite and the layer.

26. A method of casting a structural system as set forth in claim 25 including the step of accelerating the in situ polymerization by slightly elevating the temperature, however maintaining the temperature below the temperature of gasification or release of bubbles.

27. A new and improved method of forming a rigid high impact light-weight pallet as set forth in claim 25 wherein is included the step of incorporating reinforcing elements into the cellular lattice structure prior to at least one coating step.

28. A new and rigid paper material partition structure comprising:
- a first set of parallel elongate partition elements with opposing slits formed on both sides of said element at regular intervals;
- a second set of parallel elongate partition elements with slits formed on at least one side of said elements at regular intervals for engaging and intersecting the first set of elements;
- said first and second sets of partitions coupled to define a lattice structure of parallelogram cells;
- and a third set of parallel partition elements with slits formed on at least one side thereof at regular intervals for engaging and intersecting the partition elements of said first set of the other side from said second set;
- said third set of parallel partition elements coupled to the cellular lattice structure formed by the first and second sets to bisect at least some of the parallelogram cells to distribute triangular cells throughout the lattice structure thereby imparting rigidity to the paper partition structure;
- said three sets of partition elements formed of equal width and with slot configurations so that upon assembly, the tops and bottoms of the three sets coincide defining lattice cell walls with co-extensive height.

29. A new and improved structural system comprising an interpenetrating paper and plastic composite including two phases, a first phase comprising a substrate of intersecting partitions of paper material defining a cellular lattice structure as set forth in claim 28, and a second phase comprising a relatively rigid and high impact plastic polymer material penetrating an imtimately contacting the structure of the paper material filling the voids and interstices of the fibers of the paper material.

30. A new and improved structural system as set forth in claim 29 wherein said paper and plastic material composite is formed with at least one coating of a plastic material which adheres to the composite surface and forms plastic agglomerative welds or gussets at the substrate partition intersections.

31. A new and improved pallet structure having deck and legs comprised of the structural system set forth in claim 30.

32. A new rigid partition structure formed be three separate sets of intersecting slotted partition elements comprising:
- two sets of parallel intersecting partition elements defining a cellular lattice of parallelogram cells;
- and a third set of parallel partition elements bisecting at least some of the parallelogram cells to form triangular cells distributed through the lattice to impart rigidity to the partition structure;
- said three sets of partition elements formed of equal width and with slot configurations so that upon assembly, the tops and bottoms of the three sets coincide defining lattice cell walls with co-extensive height.

33. A method of adjusting the density of material in a cellular lattice structure of the type set forth in claim 32 comprising:
- varying the angle of intersection of the first and second sets of intersecting parallel partition elements to a preselected angle between 0 degrees and 90 degrees;
- bisecting at least some of the parallelogram cells formed by said first and second sets with a third set of parallel partition elements to distribute triangular cells through the lattice and impart rigidity to the cellular lattice structure.

34. A new and improved pallet structure of the type having a deck for supporting a load, and legs spacing the deck from ground to permit entry of fork lift tines for lifting the pallet and supported load, said deck and legs comprised of the rigid partition structure set forth in claim 32.

* * * * *